US006762943B2

(12) United States Patent
Yen

(10) Patent No.: US 6,762,943 B2
(45) Date of Patent: Jul. 13, 2004

(54) EXPANDING CARD FIXING STRUCTURE

(75) Inventor: Heng-Chih Yen, Taipei Hsien (TW)

(73) Assignee: Arima Computer Corp., Taipei (TW)

( * ) Notice: Subject to any disclaimer, the term of this patent is extended or adjusted under 35 U.S.C. 154(b) by 0 days.

(21) Appl. No.: 10/226,038

(22) Filed: Aug. 21, 2002

(65) Prior Publication Data
US 2004/0037029 A1 Feb. 26, 2004

(51) Int. Cl.7 .................................................. H05K 7/12
(52) U.S. Cl. ........................ 361/801; 361/759; 361/796
(58) Field of Search .............................. 361/796, 801, 361/807, 809, 798, 752, 732, 726, 759, 747; 211/41.17; 312/222; 70/85

(56) References Cited
U.S. PATENT DOCUMENTS 5,943,215 A  *  8/1999  Carney et al. .............. 361/756
6,487,089 B1 * 11/2002 Otis ........................... 361/796
6,556,451 B1 *  4/2003  Feightner et al. ........... 361/756

* cited by examiner

Primary Examiner—David Martin
Assistant Examiner—Dameon E. Levi
(74) Attorney, Agent, or Firm—Pro-Techtor International Services

(57) ABSTRACT

This invention discloses an expanding card fixing structure for fixing an expanding card in a computer. Such structure comprises an expanding slot, a fixing base and a buckle batten. The fixing base is set in the back of the computer and the expanding slot. Besides, there are at least a slot and a buckle in the fixing base. There is a buckle slot in the buckle batten connecting the buckle in the fixing base. Moreover, the buckle batten vertically extends at least an arm corresponding to the slot. And there can be an extended batten corresponding to the slot at the back of the expanding card. While inserting the expanding card into the expanding slot, the extended batten is simultaneously inserted into the slot. Then the extended batten clips firmly between the arm and a side of the slot through inserting the arm into the slot.

9 Claims, 5 Drawing Sheets

EXPANDING CARD FIXING STRUCTURE

BACKGROUND OF THE INVENTION

1. Field of the Invention

This invention discloses an expanding card fixing structure, especially using a arm inserting into a slot, which applies to clipping the extended batten of the back of the expanding card much firmly to fix the expanding card.

2. Description of the Related Art

Referring to FIG. 1, it illustrates a three-dimensional dissolution drawing of the expanding card fixing structure 100 in the prior art. There is an expanding card 101 and an expanding slot 102 in this figure. The back end of the expanding card 101 connects a fixing structure 103 with a shape of reverse L to directly lock in the case 106 of the computer apparatus 105 through a screw 104. The expanding slot 102 is in the motherboard 106 of the computer apparatus 105 to install the expanding card 101 and expand the function of the computer apparatus 105. As shown in the figure, the connector 107 is in the back end of the expanding card 101 to connect the connector 109 of the external apparatus 108.

Next, referring to FIG. 2, it illustrates that the expanding card 101 is directly inserted into the expanding slot 102 and locking the fixing structure 103 with a shape of reverse L in the back end of the expanding card 101 in the case 106 of the computer apparatus 105 through the screw 104.

However, by the appearance of the computer apparatus 105 being getting mini, the expanding card 101 is not only direct inserting into the expanding slot 102 upright but also through a conversion interface 301 as shown in FIG. 3 to make the expanding card 101 lay horizontally in the motherboard 201 of the computer apparatus 105. It can avoid the occupied space that the expanding card 101 sets upright in the motherboard 201 of the computer apparatus 105.

Referring to FIG. 3, it illustrates that the front and the back of the expanding card 101 are fixed through a slot 200 and the screw 104 and horizontal laying in the motherboard 201 of the computer apparatus 105. It seems that the defects of locking the expanding card 101 only through the screw 104 and occupied space that the expanding card 101 sets upright in the motherboard 201 of the computer apparatus 105 is solved. But in practically plugging and pulling the expanding card 101, such design of fixing with screw 104 is still inconvenient.

In the figure, it's obvious to see that it is necessary to move the computer apparatus 105 to preserve a space for taking apart the screw 104 in order to support enough moving space for the screwdriver 401. But the process seems complicate with simply plugging and pulling the expanding card 101

According to the foregoing defects, the invention gives up said design about the screw 104 and discloses a fixing structure of an expanding card 101 for easy plugging and pulling the expanding card 101 at the expanding slot 102.

SUMMARY OF THE INVENTION

The first objective of the invention discloses an expanding card fixing structure for easy plugging and pulling an expanding card at an expanding slot.

The second objective of the invention discloses an expanding card fixing structure for an expanding card laying horizontally in the motherboard of a computer apparatus to solve the defects of moving the computer apparatus to preserve enough moving space for the screwdriver in the foregoing art.

According the above-mentioned objectives, such expanding card fixing structure of the invention comprises an expanding slot, a fixing base and a buckle batten. The expanding slot vertically sets in the motherboard of a computer apparatus. The fixing base is in the back of the computer apparatus and in the back of the expanding slot. Besides, there are at least a first slot and a buckle in the fixing base. And a buckle batten further includes a buckle slot for connecting the fixing base through the buckle and the buckle batten vertically extending at least a first arm corresponding to the first slot. While inserting said expanding card into the expanding slot, an extended batten at the back of the expanding card is simultaneously inserted into the first slot, and then the extended batten clips firmly between the first arm and a side of the first slot through inserting the first arm into the first slot.

There further is a second slot in the fixing base, wherein the first slot and second slot are separated through a slot pillar (or buckle pillar) between the first slot and the second slot. Corresponding to the second slot, the buckle batten further comprises a second arm, to strengthen the connection between the buckle batten and the fixing base through inserting the second arm into the second slot.

Besides, the front of the first arm and the second arm respectively extend a hook, while inserting the first arm and the second arm into the first slot and the second slot, each hook can hook the back of a slot pillar (or buckle pillar) back between the first slot and the second slot. Wherein the first arm, the second arm and the two hooks can be shaped as a whole and elastic metal boards.

BRIEF DESCRIPTION OF DRAWINGS

The following detailed description, given by way of examples and not intended to limit the invention to the embodiment described herein, will best to be understood in conjunction with the accompanying drawings, in which.

DETAILED DESCRIPTION OF THE INVENTION

The following detailed description about the expanding card fixing structure of the invention is given by the following embodiment.

Figure 1:
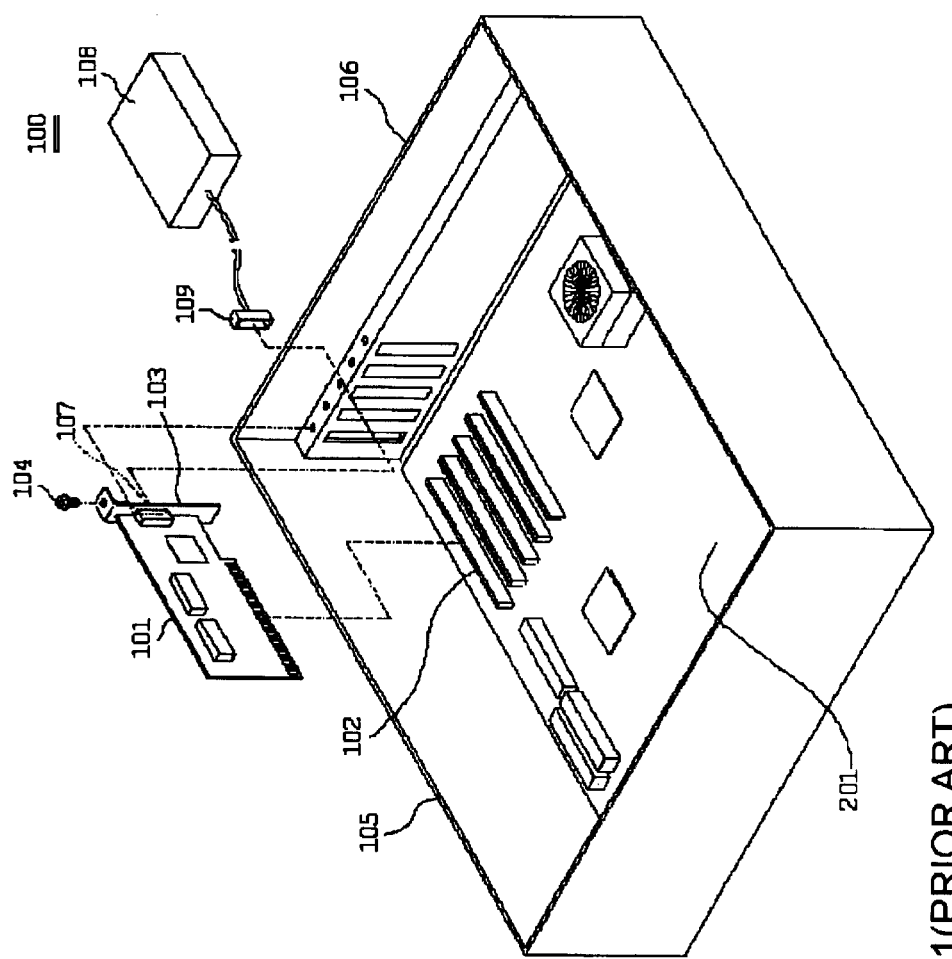
FIG. 1 illustrates a three-dimensional dissolution drawing of the expanding card fixing structure in a first prior art.
Figure 2:
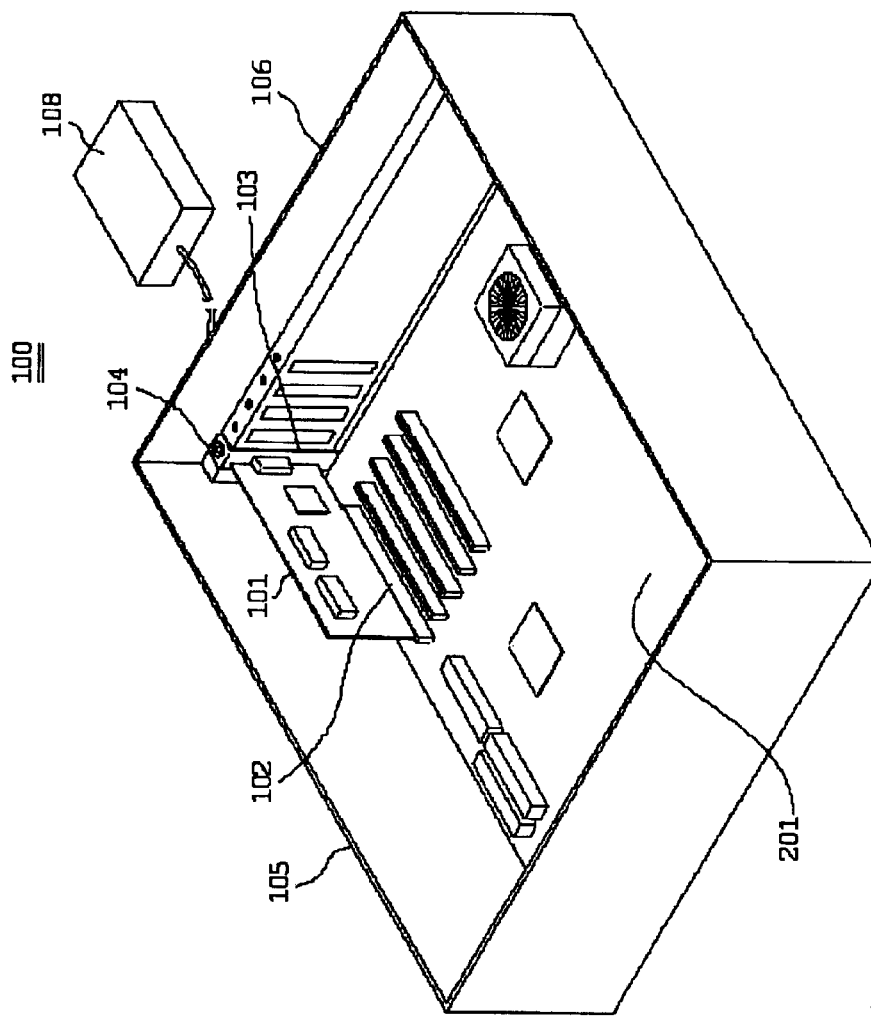
FIG. 2 illustrates a three-dimensional combination drawing of the expanding card fixing structure in the first prior art.
Figure 3:
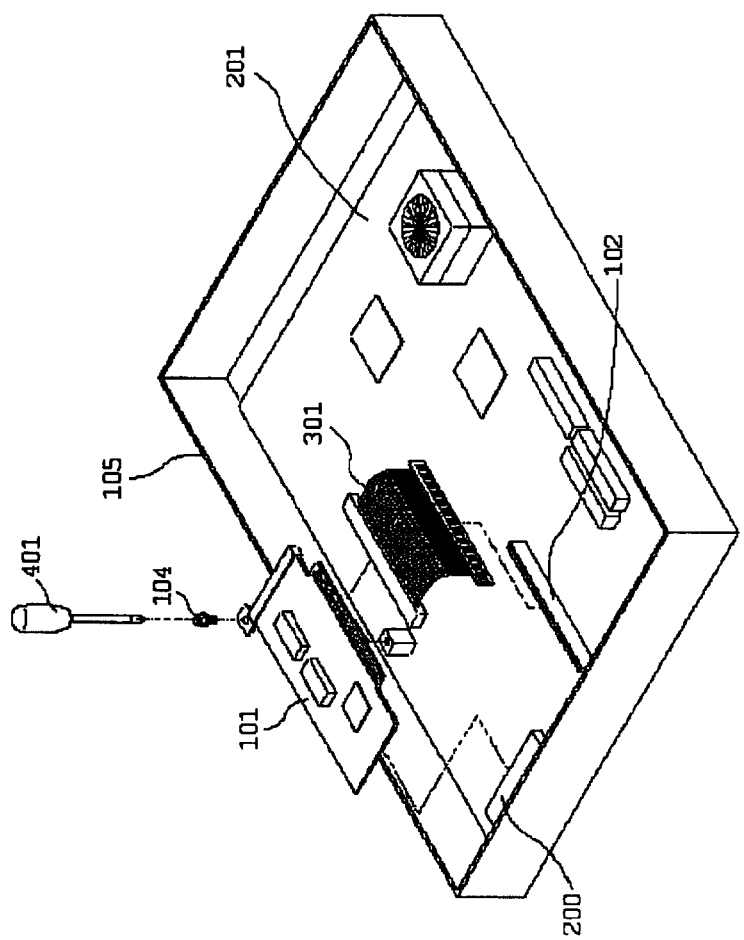
FIG. 3 illustrates a three-dimensional dissolution drawing of the expanding card fixing structure in a second prior art.
Figure 4:
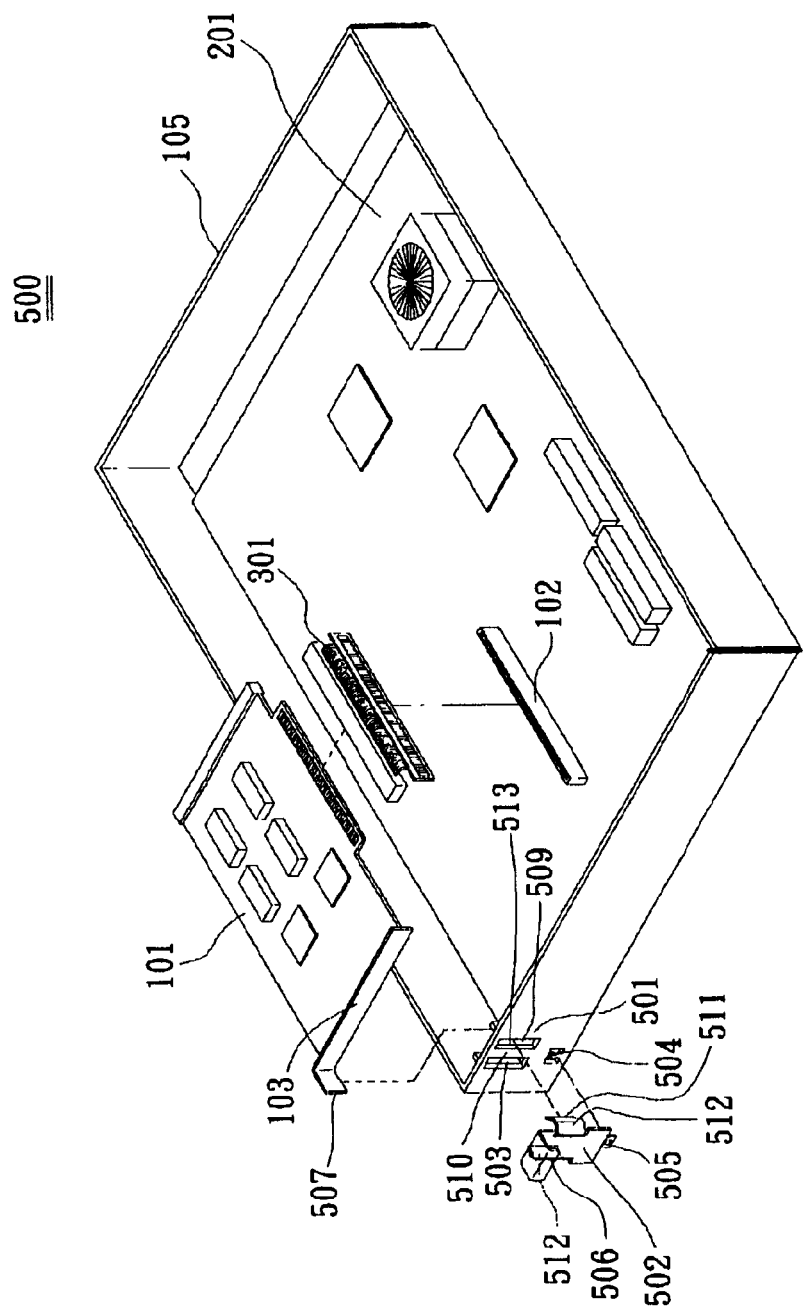
FIG. 4 illustrates a three-dimensional dissolution drawing in the invention.

FIG. 4 illustrates a dissolution drawing of the expanding card fixing structure 500 in the invention. The fixing structure 500 comprises an expanding slot 102, a fixing base 501 and a batten 502. The expanding slot 102 vertically sets in a motherboard 201 of the computer apparatus 105. The fixing base 501 is in the back of the computer apparatus 105 and in the back of the expanding slot 102. Besides, there are at least a first slot 503 and a buckle 504 in the fixing base 501. There is a buckle slot 505 in the buckle batten 502 that connects the buckle batten 502 and the fixing base 501 corresponding to the buckle 504. Wherein, the buckle batten 502 vertically extends at least a first arm 506 corresponding to first slot 503 thereof. And there can be an extended batten 507 corresponding to first slot 503 at the back of the expanding card 101.

Figure 5:
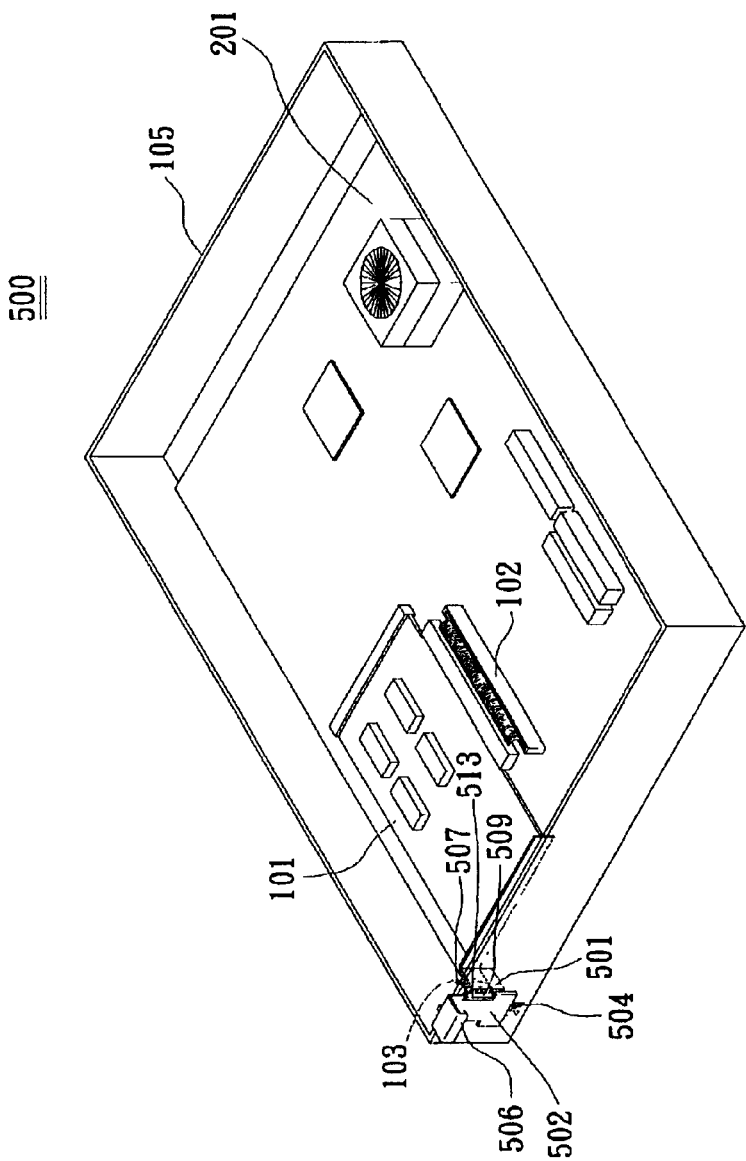
FIG. 5 illustrates a three-dimensional combination drawing in the invention.

As shown in FIG. 5, While inserting the expanding card 101 into the expanding slot 102 through the conversion apparatus 301, the extended batten 507 is simultaneously inserted into the first slot 503 to make the extended batten 507 clip firmly between first arm 506 and first slot 503.

Said fixing base 501 further comprises a second slot 509, wherein the first slot 503 and the second slot 509 are separated through a slot pillar (or buckle pillar) 510. Corresponding to the second slot 509, the buckle batten 502 further comprises a second arm 511 to strengthen the connection between the buckle batten 502 and the fixing base 501 through inserting the second arm 511 into the second slot 509.

Besides, the front of first arm 506 and second arm 511 respectively extend a hook 512, while separate inserting the first arm 506 and the second arm 511 into the first slot 503 and the second slot 509, each hook 512 can hook the back 513 of a slot pillar (or buckle pillar) 510 between the first slot 503 and the second slot 509. Moreover, the first arm 506, the second arm 511 and the two hooks 512 can be shaped as a whole and an elastic metal board.

Although described above in connection with the preferred embodiments, one skilled in the art will appreciate that the present invention can be implemented in other embodiments while remaining within the scope of the present invention as defined in the appended claims as follows.

What is claimed is:

1. An expanding card fixing structure for fixing an expanding card in a computer, said fixing structure comprising:

an expanding slot positioned in a motherboard of the computer, a fixing base positioned at an end of the computer, said fixing base including at least one slot in a wall of the computer, a securing batten with at least one arm extending therefrom and passing from an outer side of the wall of the computer through said slot when said securing batten is in a securing position, and an extended batten projecting from the expanding card; wherein, when the expanding card is inserted into the expanding slot, said extended batten of said expanding card is simultaneously inserted into said first slot of said fixing base from an inner side of the wall of the computer, said extended batten being firmly wedged between said arm of said securing batten and a side of said slot so that the expanding card is fixed in position.

2. The expanding card fixing structure of claim 1, wherein:

said fixing base comprises at least two slots, and said securing batten comprises at least two arms; such that said two arms of said securing batten are received in said slots of said fixing base, thereby strengthening a connection between said securing batten and said fixing base.

3. The expanding card fixing structure of claim 2, wherein:

a hook extends from each of said arms, each said hook engaging a slot pillar that separates said two slots.

4. The expanding card fixing structure of claim 3, wherein:

said arms and said hooks are formed as an integral unit.

5. The expanding card fixing structure of claim 3, wherein:

said arms are formed from metal.

6. An expanding card fixing structure for fixing an expanding card in a computer, said fixing structure comprising:

an expanding slot positioned in a motherboard of the computer, a fixing base positioned at an end of the computer, said fixing base including at least one slot in a wall of the computer and at least one buckle element in the wall, a securing batten with at least one arm extending therefrom and passing from an outer side of the wall of the computer through said slot when said securing batten is in a securing position, said securing batten further comprising at least one buckle slot, and an extended batten projecting from the expanding card; wherein, when the expanding card is inserted into the expanding slot, said buckle element in the wall simultaneously receives said buckle slot of said securing batten, and said extended batten of said expanding card is simultaneously inserted into said first slot of said fixing base from an inner side of the wall of the computer, said extended batten being firmly wedged between said arm of said securing batten and a side of said slot so that the expanding card is fixed in position.

7. The expanding card fixing structure of claim 6, wherein:

said securing batten further comprises at least a second arm, said second arm strengthening a connection between said securing batten and said fixing base by said second arm hooking a buckle pillar of said securing base.

8. The expanding card fixing structure of claim 7, wherein:

said arms are formed as an integral unit.

9. The expanding card fixing structure of claim 8, wherein:

said arms are formed from metal.

* * * * *